United States Patent [19]
Okada

[11] 3,758,133
[45] Sept. 11, 1973

[54] SHOCK ABSORBING AIR BAG APPARATUS IN A MOTOR CAR

[75] Inventor: Motohiro Okada, Tokyo, Japan

[73] Assignee: Honda Giken Kogyo Kabushiki Kaisha, Tokyo, Japan

[22] Filed: June 3, 1971

[21] Appl. No.: 149,695

[30] Foreign Application Priority Data
June 4, 1970 Japan................ 45/47581

[52] U.S. Cl. ......... 280/150 AB, 182/137, 244/121, 251/299, 251/303, 244/138 R
[51] Int. Cl. ............................................. B60r 21/08
[58] Field of Search................ 280/150 AB, 150 B; 244/122 R, 122, 138 R; 251/299, 303

[56] References Cited
UNITED STATES PATENTS

| | | | |
|---|---|---|---|
| 1,483,354 | 2/1924 | Kopper | 251/299 |
| 3,229,932 | 1/1966 | Yost | 244/31 |
| 3,370,886 | 2/1968 | Frost | 280/150 AB |
| 3,476,402 | 11/1969 | Wilfert | 280/150 AB |
| 3,527,475 | 9/1970 | Carey et al. | 280/150 AB |
| 3,624,810 | 11/1971 | Hass | 280/150 AB |

FOREIGN PATENTS OR APPLICATIONS 896,312 10/1953 Germany................ 280/150 AB Primary Examiner—Kenneth H. Betts
Assistant Examiner—John P. Silverstrim
Attorney—Waters, Roditi, Schwartz & Nissen

[57] ABSTRACT

To prevent rebound of a driver from an inflated air bag in a motor vehicle at the time of a collision, a valve or escape device is coupled to the air bag to permit expulsion of air from the bag as the driver is thrust against the bag. The valve may be connected to an air chamber through which the bag is inflated by a gas generating apparatus, and the valve is subjected to operation by an actuation which acts to open the valve when the air bag presses against the actuator upon impact of the driver with the air bag. The valve may also be formed by a thin portion of the air bag which is pressed against a cutter when the driver impacts against the air bag whereby the bag is cut and the air can escape.

6 Claims, 6 Drawing Figures

PATENTED SEP 11 1973 3,758,133

INVENTOR
motohiro Okada

INVENTOR
motohiro Okada

SHOCK ABSORBING AIR BAG APPARATUS IN A MOTOR CAR

BRIEF SUMMARY OF THE INVENTION

This invention relates to an air bag apparatus used in a motorcar and the type in which an air bag is arranged to expand rapidly in front of a driver upon collision of the motorcar for protecting the driver by the shock absorbing action thereof. The invention is more particularly directed to such an apparatus wherein the repulsion force of the expanded air bag exerted on the driver is diminished so that the danger of injury to the driver by the repulsion is prevented.

According to this invention in a safety apparatus in a motorcar the type in which an air bag is arranged to rapidly expand in front of a driver upon collision of the motorcar, a valve mechanism is provided and is automatically opened for allowing the internal air in the air bag to leak out when the driver is forced into contact with the air bag and the air bag is deformed.

DETAILED DESCRIPTION

Figure 1:
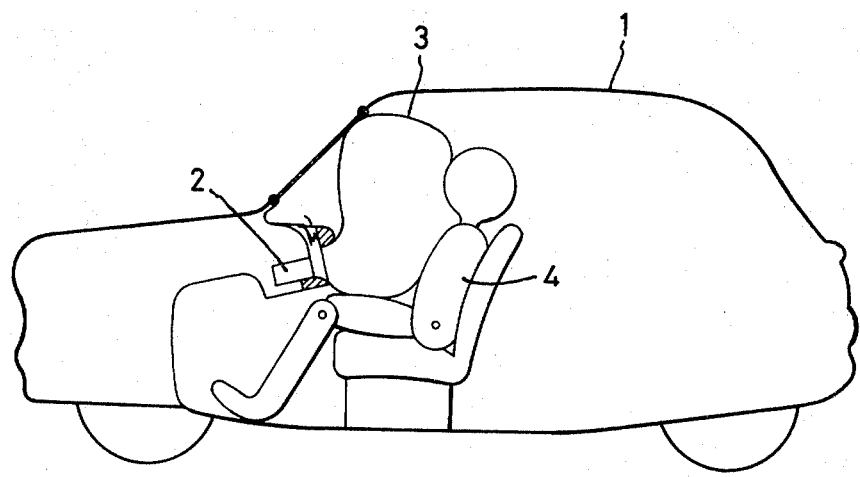
FIG. 1 is a diagrammatic side elevational view of one embodiment of this invention wherein an air bag is in its expanded condition.
Figure 2:
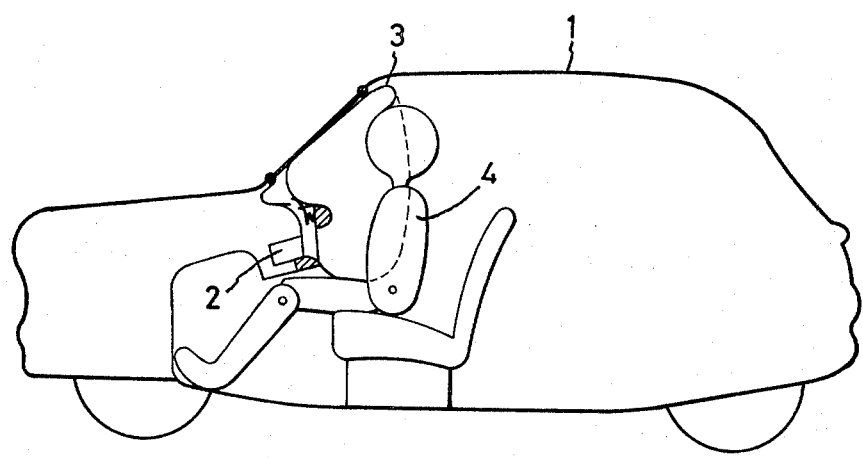
FIG. 2 is a diagrammatical side view thereof showing the driver thrust against the air bag.
Figure 3:
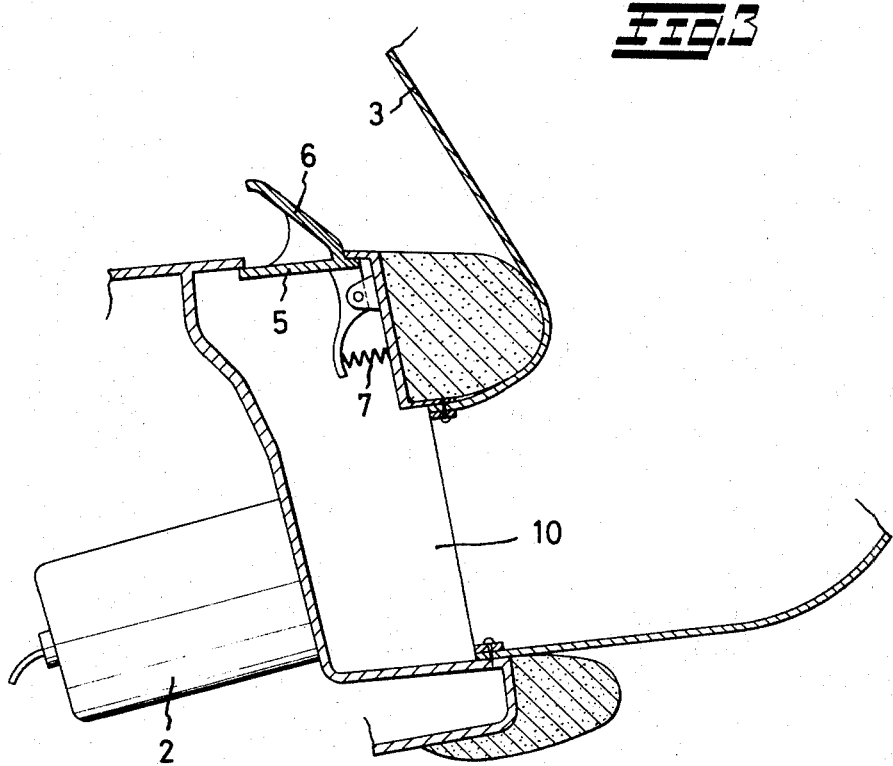
FIG. 3 is a sectional side view of a valve or escape portion of the air bag.
Figure 4:
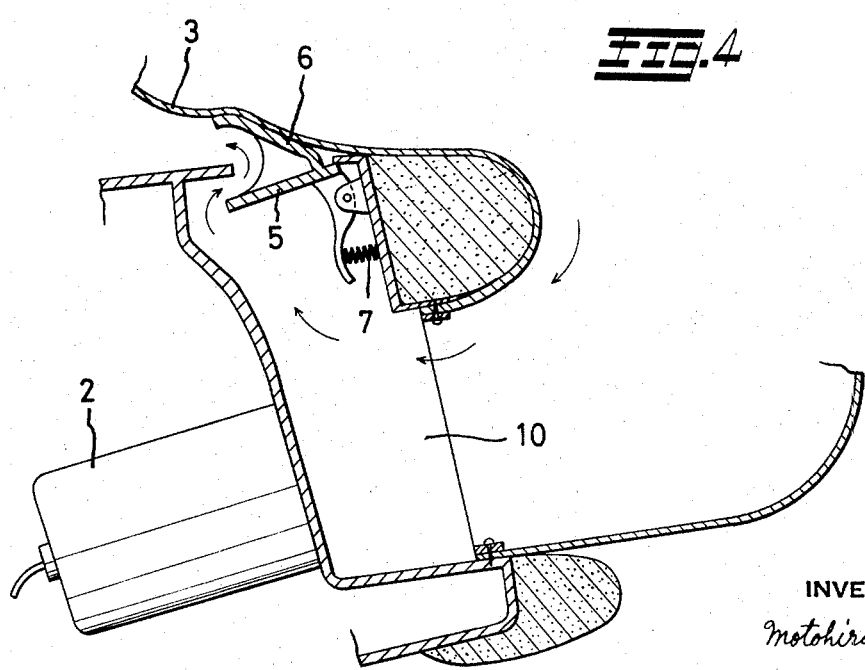
FIG. 4 is a sectional side view of the valve portion wherein the valve is open.

When a motorcar 1 is abruptly stopped as in a collision, a gas generating apparatus 2 is operated and an air bag 3 whose interior is connected to the air generating apparatus 2, is rapidly expanded in front of a driver 4 to cushion forward movement of the driver. The driver 4 is forced against the air bag 3 and pushes the air bag forward whereby the air bag 3 is deformed as shown in FIG. 2. At this time, a push member 6 of a valve 5 mounted at the base portion of the air bag 3 (as shown in FIG. 3) is pushed by the front surface of the bag 3, whereby the valve 5 is opened against the action of a spring 7 whereby the internal air of the bag 3 leaks out, as shown in FIG. 4. Numeral 10 denotes an air chamber provided on the car body, and the air bag 3 is connected thereto. The valve 5 is mounted on the car body and is connected to chamber 10.

Figure 5:
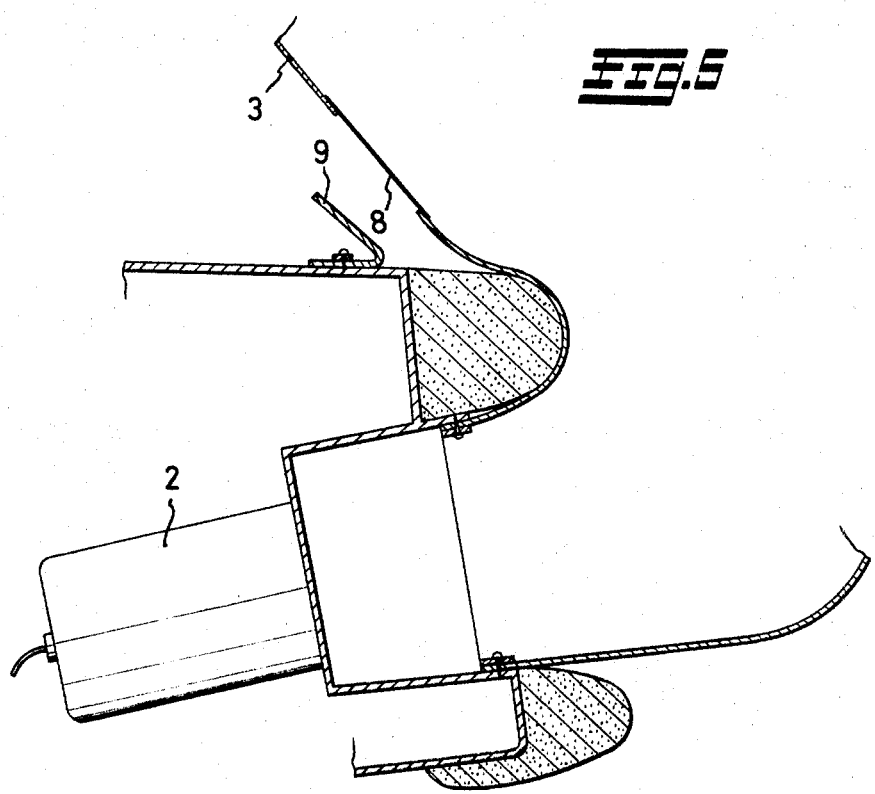
FIG. 5 is a sectional side view of a modified embodiment of the valve portion.
Figure 6:
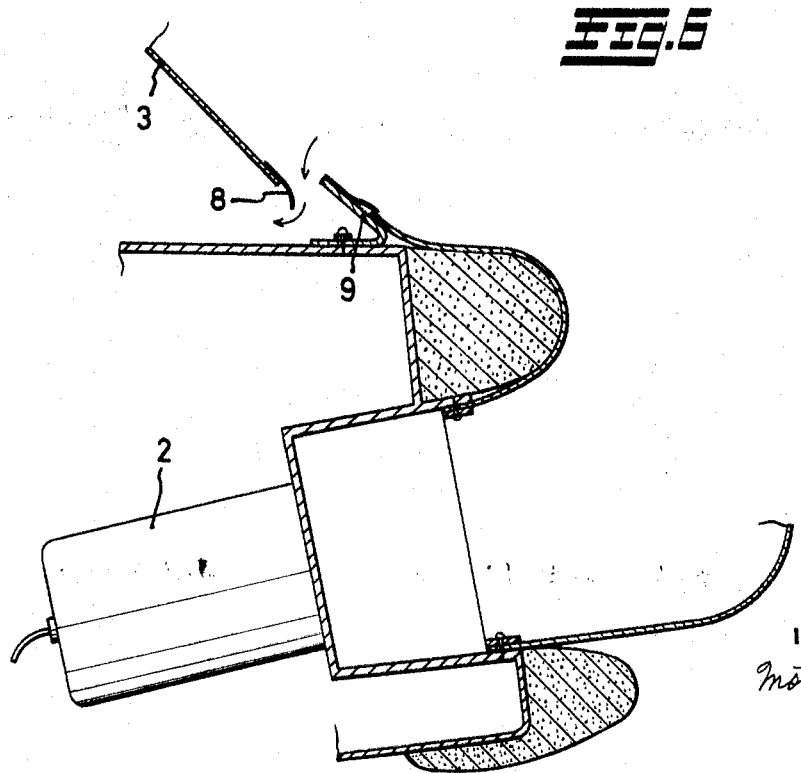
FIG. 6 is a sectional side view thereof wherein the valve is open.

In a modified embodiment, a part of the front surface portion of the air bag 3 is formed as a film 8 of reduced thickness as shown in FIG. 5 to serve as a valve. When the bag 3 is deformed by being pushed forwards, as shown in FIG. 6, the film 8 is cut by a fixed cutter 9 mounted on the car body in front of the film 8. In both of these embodiments, a proper amount of air is discharged and the repelling force of the air bag 3 is diminished.

For lowering the repelling power of the air bag acting on the driver, it has been hitherto proposed that the air bag be provided with a small hole for air leakage. However, with this arrangement not only is there waste in that the internal air leaks in the course of expansion of the air bag, but also there is a great time lag between the collision of the car and the expansion of the bag, so that the original effect of the air bag cannot be fully obtained. An arrangement has also been proposed in which the internal air is automatically leaked when the internal pressure reaches a certain predetermined limit. In such arrangement an instability is present which is unavoidable in that the internal pressure is varied with the amount of gas generated by the gas generating apparatus or by the temperature at the time of operation thereof, etc.

This invention obviates these defects in such a way that when the driver is flung against the air bag upon vehicle collision, the bag is pushed and is deformed forwards, and thereby the normally closed escape device is immediately opened for discharging the internal air from the bag to decrease the internal pressure. Thus, the repelling force of the air bag exerted on the driver is immediately diminished and the danger caused by repulsion or rebound is prevented.

What is claimed is:

1. For a shock absorbing air bag apparatus in a motorcar in which an air bag is arranged to rapidly inflate in front of a driver upon collision of the motorcar: a controlled escape mechanism coupled to the air bag and normally closed, and means to open the escape mechanism when the driver is forced into contact with the air bag and the air bag has undergone a predetermined deformation as a result thereof, said escape mechanism comprising a displaceable valve member which when opened releases air from the bag, said means to open the escape mechanism comprising an actuator for said valve member, said actuator being located in spaced relation behind the air bag so as to be activated by contact with the bag when the bag is inflated and has been deformed by contact of the driver.

2. The combination as claimed in claim 1 comprising an elastic means acting on said valve to urge the valve member to closed position.

3. The combination as claimed in claim 3 wherein the motorcar has a body defining an air chamber which is connected to a gas generating apparatus, the air bag being connected to the chamber, said valve member being separate from said air bag and mounted on said body at said air chamber.

4. The combination as claimed in claim 3 wherein said valve member and actuator are integral.

5. The combination as claimed in claim 1 wherein said valve member is constituted by a portion of the bag of reduced thickness, said actuator comprising a fixed cutter positioned adjacent said portion of the bag of reduced thickness to cut the same when the bag is inflated and deformed by contact of the driver.

6. The combination as claimed in claim 5 wherein said portion of reduced thickness of the bag is constituted by a restricted region facing said cutter.

* * * * *